US008909264B1

(12) United States Patent
Higuchi et al.

(10) Patent No.: US 8,909,264 B1
(45) Date of Patent: Dec. 9, 2014

(54) SERVER SYSTEM FOR RECEIVING, PROCESSING AND REPORTING SENSOR DATA

(71) Applicants: Evan Y. Higuchi, Kaneohe, HI (US); Nackieb M. Kamin, Kapolei, HI (US); Adrianne Tom, Honolulu, HI (US)

(72) Inventors: Evan Y. Higuchi, Kaneohe, HI (US); Nackieb M. Kamin, Kapolei, HI (US); Adrianne Tom, Honolulu, HI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/628,110

(22) Filed: Sep. 27, 2012

(51) Int. Cl.
*H04W 4/00* (2009.01)
*H04W 24/00* (2009.01)

(52) U.S. Cl.
USPC ........................................ 455/466; 455/456.3

(58) Field of Classification Search
USPC ............ 455/466, 456.1–456.6, 418–420, 455
See application file for complete search history.

(56) References Cited

U.S. PATENT DOCUMENTS

| | | | |
|---|---|---|---|
| 6,690,939 B1 * | 2/2004 | Jonsson et al. | 455/453 |
| 6,914,525 B2 | 7/2005 | Rao et al. | |
| 7,139,588 B2 * | 11/2006 | Lee et al. | 455/552.1 |
| 7,877,502 B2 | 1/2011 | Rensin et al. | |
| 8,121,622 B2 * | 2/2012 | Han et al. | 455/456.5 |
| 2002/0069312 A1 * | 6/2002 | Jones | 711/100 |
| 2006/0030339 A1 * | 2/2006 | Zhovnirovsky et al. | 455/456.6 |
| 2012/0238251 A1 * | 9/2012 | Lee et al. | 455/414.1 |

FOREIGN PATENT DOCUMENTS

WO   WO 2009/034406 A1 *   9/2007   .............. G06F 17/30

OTHER PUBLICATIONS

Eric Mensah-Okantey, Barend Kobben; "Mobile GIS for Cadastral Data Collection in Ghana"; Geospatial Crossroads @ GI Forum 2008; pp. 199-204.
Ming-Hsiang Tsou; "Integrated Mobile GIS and Wireless Internet Map Servers for Environmental Monitoring and Management"; Cartography and Geographic Information Science, vol. 31, No. 3, 2004, pp. 153-165.
Enrique R. Vivoni, Richard Camilli; "Real-Time streaming of environmental field data"; Computers & Geosciences 29 (2003); pp. 457-468.

* cited by examiner

*Primary Examiner* — Brandon Miller
(74) *Attorney, Agent, or Firm* — SPAWAR Systems Center Pacific; Kyle Eppele; Stephen E. Baldwin

(57) ABSTRACT

In one embodiment, a server system is provided for receiving, processing and reporting sensor data from remote sources. The server system comprises a database; a Geographic Information System (GIS) application; and programs for receiving geographic sensor data from the remote sources representative of geospatial-type information through connections to a computer network and to a cellular network transmitted by the remote sources through computer network communication protocols or short message service (SMS) cellular network communication protocols; processing the received geographic sensor data for storage in the database; and displaying the processed geographic sensor data through the GIS application to users via the cellular network or the computer network.

7 Claims, 3 Drawing Sheets

SERVER SYSTEM FOR RECEIVING, PROCESSING AND REPORTING SENSOR DATA

FEDERALLY-SPONSORED RESEARCH AND DEVELOPMENT

This invention (Navy Case NC 101,409) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

BACKGROUND OF THE INVENTION

The practice of using Geographic Information System (GIS) computer applications for storing and analyzing geospatial information and associated measurement data has been in place for decades. The purpose of a GIS is to collect and store geographically referenced data to allow subsequent modeling and distribution. The data is transferred to the GIS from remote devices capable of reporting GPS coordinates along with other sensor measurements. Traditional methods for transmitting geospatial data to a GIS require user interaction for both data input to the device and subsequently commanding the device to initiate transmission. Additionally, this communication is initiated by the remote device, which essentially pushes data to the GIS. The rate at which data is uploaded to the GIS is determined entirely by the operators of the remote devices, potentially impacting the accuracy of the GIS models.

To adapt these methods for use with remote, unattended sensor devices programmed to report data to the GIS, the GIS must be able to pull sensor and geospatial data from the devices or, at minimum, be able to query the devices for status updates. It is important for the server system to know the state of the remote devices due to the differing rate of geospatial data uploads between the devices and the unattended nature of the sensors. For example, an automated, unattended sensor device may include the capability to transmit geospatial data over a wireless network and, in order to preserve battery life, may be programmed to transmit that information infrequently to a GIS. In an emergency situation, users of that GIS may require sensor information on demand to provide an up-to-date operational picture. In situations such as those, it is advantageous for a GIS to include the capability to pull data from remote devices on demand instead of having data pushed to the system when available.

SUMMARY OF THE INVENTION

A service-requester/server system for receiving, processing and reporting geospatial sensor data from remote sources via a cellular network and a computer network, the service-requester/server system comprising a database; a Geographic Information System (GIS) application; the database including programs for requesting and receiving geographic sensor data representative of geospatial-type information through an Internet connection and a cellular network connection transmitted by the remote sources through TCP/IP communication protocols or Short Message Service (SMS) communication protocols where the cellular network includes a base station having a traffic channel and a control channel, where the control channel is used for periodic network communication including call synchronization, setup, and handoff transmissions and when the traffic channel reaches full capacity for SMS messages and additional SMS messages fail to be transmitted in the traffic channel, and when the additional SMS messages are received on the control channel of the base station of the cellular network when the traffic channel is at the full capacity; processing the received geographic sensor data for storage in the database; and displaying the processed geographic sensor data through the GIS application to users via the cellular network or the computer network.

BRIEF DESCRIPTION OF THE DRAWINGS

The invention will be more fully described in connection with the annexed drawings, where like reference characters designate like components, in which.

DETAILED DESCRIPTION OF THE EMBODIMENTS

Figure 1:
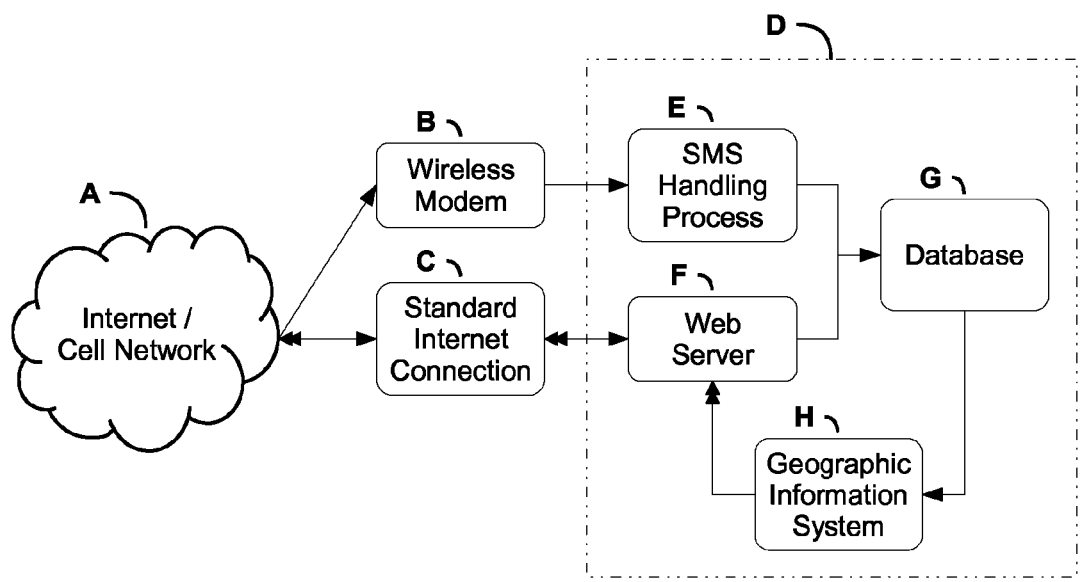
FIG. 1 shows a block diagram of the server system.

In one embodiment, a server system if provided for receiving, processing, and reporting geographic sensor data from sources that communicate through TCP/IP or Short Message Service (SMS) cellular network protocols. The geographic sensor data is representative of geospatial information and associated measurement data.

The server system comprises a database, a Geographic Information System (GIS) application, and programs to receive and process data through connections to a cellular or computer network. One purpose of the server system is to receive data transmitted over the internet or cellular network by remote sensors, process this information, and display the combined data through a GIS to users via the internet.

The sensor data can be received through a standard web interface using an internet connection or in Short Message Service (SMS) text format using a wireless modem.

SMS is a text messaging service component of phone, web or mobile communication systems, using standardized communication protocols that allow the exchange of short text messages between fixed line or mobile phone devices.

Additionally, the server system has the capability to periodically request the status and other data from remote sensor devices, through automated polling or on command, in order to obtain data from the entire sensor network within a short time frame.

The server system addresses the complications involved with gathering data from a large number of remote devices and distributing the combined data to appropriate users in a time-relevant manner. One area of focus for the server system is in chemical, biological, radiological, and nuclear (CBRN) monitoring or consequence management events. During these events, sensor information from the field must be transmitted to a central command center for analysis and planning; reducing the time spent gathering, processing, and displaying this information to operational command is critical to ensuring timely, effective decision-making.

The server system is designed to use the Short Message Service (SMS) capability of cellular networks to actively request sensor and geospatial data from remote sensor devices able to be configured to handle the request.

Additionally, the server system addresses the need for maintaining operation of the GIS during an event such as a CBRN event, a natural disaster event, or other emergency events.

Existing GIS reporting devices capable of wirelessly transmitting data over cellular networks use the traffic channels of a cell tower or base station to send the data to a GIS. During a disaster, the traffic channels of a base station quickly fill to capacity due to the increase in call requests from cell phone users. Since new calls are blocked by the congested base station, communication between the GIS and reporting devices is interrupted.

To maintain operability when the quality of service of the cellular network diminishes, the server system is designed to accept incoming cellular network data in SMS format in addition to TCP/IP methods. An advantage of using SMS is that SMS messages are transmitted over the control channels of base stations instead of on a traffic channel.

The control channels are used for periodic network communication such as call synchronization, setup, and handoff transmissions which are small in size and occur infrequently compared to the transmissions of dedicated traffic channels. This means that SMS messages can be successfully transmitted when the traffic channels of a base station are at full capacity and additional call requests fail.

The basic structure of the server system is shown in FIG. 1. The server system is designed to receive data transmitted over the internet or cellular network by remote sensors, process this information, and display the combined data through a GIS to users via the internet. Remote sensors considered for use with this system include sensor devices attached to computers, smartphones, or any other computing device capable of running user-defined programs and transmitting information over wired or wireless networks.

In FIG. 1, the server system receives data from external networks (A) through the server's wireless modem (B) and internet connection (C). The dedicated server applications that handle SMS processing (E), web interface (F), database storage (G), and GIS program (H) are considered the server portion of this system (D). The specific processes used to extract sensor and geospatial information from the incoming data differ depending on the originating network.

The cellular network (A) is connected to the server system (D) through the wireless modem (B) and enables delivery of SMS messages to the system from remote reporting devices. SMS messages may be accessed directly through the wireless modem (B) or may be provided through services from the cellular provider, allowing access of SMS messages through an internet connection (C). Relevant data is extracted from the SMS message by a process (E) running on the server which enters the sensor and geospatial information into a database (G) also residing on the server.

The internet (A) is connected to this server system (D) through a standard wired or wireless internet connection (C). Remote devices are able to enter sensor and geospatial information through a web interface to the web server (F) which then stores the data in the database (G).

The GIS program (H) running on the server accesses the database (G) to associate geospatial data received from remote devices with geographic information stored within the GIS. This enables the GIS to overlay the information received from remote devices on a map at the designated coordinates. The resulting map is then hosted on the internet through the web server (F) and can incorporate interactive features to enable user to reposition or magnify content, for example.

The server system has the capability to actively request sensor and geospatial data from remote sensor devices using SMS messages. This process, with basic flowchart shown in FIG. 2, can occur independently of the operation illustrated in FIG. 1.

Figure 2:
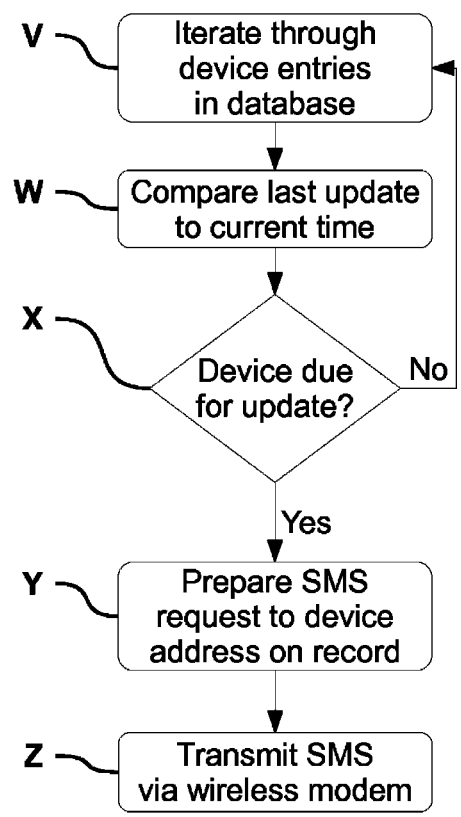
FIG. 2 shows a process of actively requesting sensor and geospatial data from remote sensor devices.

In FIG. 2, the process is activated at defined intervals to monitor the database entries stored for data transmissions from each device. The process checks each device's entry in the database (V). The timestamp of the last entry for the device is compared to the system time (W) which determines whether the server system sends an update request to the device (X); if the difference in time is greater than a defined threshold, the system creates a SMS message addressed to the phone number of the device (Y). The SMS message is then sent through the wireless modem connected to the server (Z).

Figure 3:
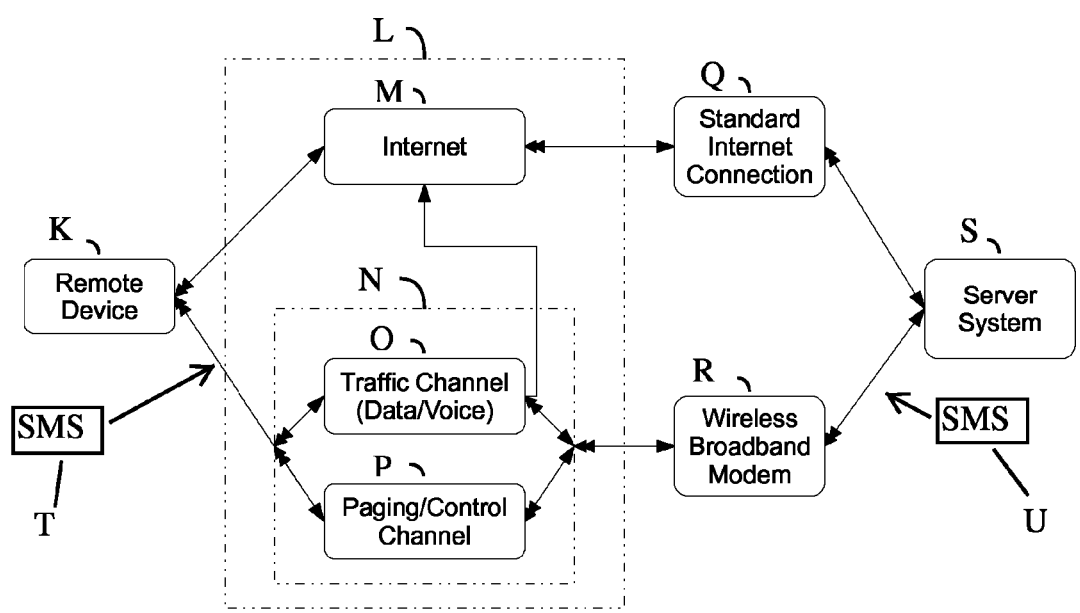
FIG. 3 shows an example of data, call and control channels of a cellular base station during the operation of the server system.

The operation of transmitting data between a remote sensor device and the server system is shown in FIG. 3.

In FIG. 3, transmission of sensor data from the remote device (K) to the server system (S) is denoted by single arrows progressing from left to right in FIG. 3. The remote device (K) may choose to transmit data through different mediums of wired or wireless communication (L). Applicable mediums of data transmission include the Internet (M) via Internet access points and specific logical channels of telecommunications protocol accessed through the cellular network (N). The specific logical channels are the traffic channel (O) and the paging or control channel (P) which may vary in name depending on the particular mobile technology standard, but functions equivalently for the purpose of this system.

In FIG. 3, the server system (S) is connected to the Internet through standard wired or wireless Internet access technologies and possesses an externally accessible interface (Q) such as a web page or database. The remote device (K) can send data to that interface (Q) through the Internet (M) that has either been accessed directly by the remote device through an Internet communication protocol, such as TCP, or through the cellular network (N) via a traffic channel (O).

In FIG. 3, SMS messages (T) may be sent from the remote device (K) through the cellular network (N). SMS messages (T) can be sent through either the traffic channels (O) or the paging/control channel (P). An advantage of using the paging/control channel (P) to transmit data is that this channel remains operable when all traffic channels are allocated, which may occur when a high volume of calls are placed in a short time frame. The broadband modem (R) of the server system (S) is able to accept SMS messages (T) from the remote device (K) via the cellular network (N).

Regardless of the method of data transmission, the server system (S) processes the received data and extracts the relevant information for use in the visual geographic information overlay as described in FIG. 1.

Referring again to FIG. 3, the server system (S) may also transmit information to remote devices (K) through the same methods of communication described above. These paths from server to remote device are indicated with double arrows and progress from right to left. The server system (S) may provide the remote device (K) with the geographic information overlay via the Internet (M). The server system (S) may send SMS messages (U) through the broadband modem (R) over the cellular network (R) to the remote device (K) to either request an update from the device, as shown in FIG. 2, or to provide the remote device with informational updates using sensor data from the database.

The remote devices must be programmed to handle the SMS formatted messages sent from this server system. Devices such as smartphones or computers with a wireless modem are capable of running programs to handle incoming data update requests from the server. This enables those devices to communicate sensor information to the server system using an automated process.

In order to ensure authenticity of received data, the reporting devices must be registered with the server system and assigned with a unique identifier which is stored in the server database. When the device transmits sensor and geospatial information to the GIS, it appends the designated identifier to the data and the server verifies the identity of the device based on the stored registry. However, the server system may accept phone numbers or other less secure means of identification of remote devices if directed by the server operator. This may be beneficial when the device identity is unknown prior to data transmission to the server system. The server may then issue a unique identifier to the device to be used for subsequent transmissions.

The server system is designed to automate the collection, processing, and presentation of sensor and geospatial data. The data may be received from both remote, unattended sensor devices and user-operated devices operating in an area of interest. The data is processed and stored by the server and the resulting information is modeled by a Geographic Information System (GIS) to associate the received sensor data with geographical coordinates. The resulting interactive map is hosted by the web server to enable users access through the internet.

Situations in which this invention could be used include prediction, warning, and monitoring of CBRN or natural disaster events through the use of unmanned sensors and assisting emergency response and consequence management operations through the coordination and distribution of information.

The capability of this system to communicate using TCP/IP and SMS formats allow the system to function efficiently under normal conditions and maintain operability in the event that the wired or wireless networks of the remote devices become congested, as is common during a disaster. Through SMS support, the system is able to request updates from the remote devices either automatically or through user command in order to obtain up-to-date sensor information from the field.

Exemplary advantages and features are as follows:

Designed to use SMS transmissions, in addition to existing methods, to enable the system to operate over a congested cellular network Designed with the capability to actively request data from remote reporting devices Design features facilitate the use of remote, unattended sensor devices and automatic processing and display of received data.

In alternative embodiments, the sensor and geospatial information received by the server system may be processed by other programs than the Geographic Information System specified. Accordingly, the result of the processed data can be represented in forms other than on a map. The system could also be configured to transmit warning messages through SMS to emergency medical services or registered users if specific predefined events are detected by the system.

While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A service-requester/server system for receiving, processing and reporting geospatial sensor data from remote sources via a cellular network and a computer network, the service-requester/server system comprising: a server;
   a database; a Geographic Information System (GIS) application; the database including programs for:
      requesting and receiving geographic sensor data representative of geospatial-type information through an Internet connection and a cellular network connection transmitted by the remote sources through TCP/IP communication protocols or Short Message Service (SMS) communication protocols, where the cellular network includes a base station having a traffic channel and a control channel, where the control channel is used: for periodic network communication including call synchronization, setup, and handoff transmissions; and when the traffic channel reaches full capacity for SMS messages and additional SMS messages fail to be transmitted in the traffic channel, wherein the additional SMS messages are received on the control channel of the base station of the cellular network when the traffic channel is at the full capacity;
      processing the received geographic sensor data for storage in the database; and
      displaying the processed geographic sensor data through the GIS application to users via the cellular network or the computer network.

2. A service-requester/server system for receiving, processing and reporting geospatial sensor data from remote sources via a cellular network and a computer network, the service-requester/server system comprising: a server;
   a database; a Geographic Information System (GIS) application; the database including programs for:
      requesting and receiving geographic sensor data from the remote sources representative of geospatial-type information through connections to a computer network and to a cellular network transmitted by the remote sources through computer network communication protocols or short message service (SMS) cellular network communication protocols, where the cellular network includes a base station having a traffic channel and a control channel, where the control channel is used: for periodic network communication including call synchronization, setup, and handoff transmissions; and when the traffic channel reaches full capacity for SMS messages and additional SMS messages fail to be transmitted in the traffic channel, wherein the additional SMS messages are received on the control channel of the base station of the cellular network when the traffic channel is at the full capacity;
      processing the received geographic sensor data for storage in the database; and
      displaying the processed geographic sensor data through the GIS application to users via the cellular network or the computer network.

3. The service-requester/server system of claim 2 wherein the cellular network communication protocols are Short Message Service (SMS) protocols.

4. The service-requester/server system of claim 3 wherein the computer network communication protocols are TCP/IP protocols.

5. A service-requester/server system for receiving, processing and reporting geospatial sensor data from remote sources, the service-requester/server system comprising: a server;
   a database; a Geographic Information System (GIS) application; the database including programs for:

requesting and receiving geographic sensor data from the remote sources representative of geospatial-type information through connections to a computer network and to a cellular network transmitted by the remote sources through computer network communication protocols or short message service (SMS) cellular network communication protocols, where the cellular network includes a base station having a traffic channel and a control channel, where the control channel is used: for periodic network communication including call synchronization, setup, and handoff transmissions; and when the traffic channel reaches full capacity for SMS messages and additional SMS messages fail to be transmitted in the traffic channel, wherein the additional SMS messages are received on the control channel of the base station of the cellular network when the traffic channel is at the full capacity;

processing the received geographic sensor data for storage in the database; and displaying the processed geographic sensor data through the GIS application to users via the cellular network or the computer network.

6. The service-requester/server system of claim 5 wherein the cellular network communication protocols are Short Message Service (SMS) protocols.

7. The service-requester/server system of claim 6 wherein the computer network communication protocols are TCP/IP protocols.

\* \* \* \* \*